United States Patent [19]
Wang

[11] Patent Number: 5,545,931
[45] Date of Patent: Aug. 13, 1996

[54] APPARATUS FOR TEMPORARILY SHUTTING OFF ELECTRIC POWER TO AN AIR CONDITIONING COMPRESSOR USING A PISTON AND MICROSWITCH

[76] Inventor: Chin-Li Wang, No. 1, Alley 88, Lane 150, Sec. 2, Hi-Dan Rd., Tainan City, Taiwan

[21] Appl. No.: 437,464

[22] Filed: May 8, 1995

[51] Int. Cl.$^6$ ................ B60C 1/00; B60H 1/32
[52] U.S. Cl. ............................. 307/10.1; 62/133
[58] Field of Search .................... 307/9.1, 10.1, 307/118; 200/81 R, 82 R, 82 C, 82 D; 62/133

[56] References Cited

U.S. PATENT DOCUMENTS

| | | | |
|---|---|---|---|
| 3,462,964 | 8/1969 | Haroldson | 62/133 |
| 4,135,368 | 1/1979 | Mohr et al. | 62/133 |
| 4,226,090 | 10/1980 | Horian | 62/133 |
| 4,269,033 | 5/1981 | Birch | 62/133 |
| 4,355,523 | 10/1982 | Shimada | 62/133 |
| 4,932,841 | 6/1990 | Havemann | 200/82 R |
| 5,256,840 | 10/1993 | Pirhadi | 200/82 R |

FOREIGN PATENT DOCUMENTS 0053916  5/1981  Japan ........................... 62/133

Primary Examiner—William M. Shoop, Jr.
Assistant Examiner—Richard T. Elms
Attorney, Agent, or Firm—Morton J. Rosenberg; David I. Klein

[57] ABSTRACT

An apparatus for temporarily shutting off electric power to an air conditioning compressor of a vehicle is provided. The apparatus comprises a fixture having bent and upwardly extending sides that form a seat adapted to receive a portion of a tube. A piston is slidably received in the tube and has a rod securely attached to one end thereof. A linking rod is secured to the opposite side of the piston, and a spring plate of a microswitch is connected to the linking rod for turning the microswitch on and off. When the microswitch is turned off, an air conditioning compressor is no longer supplied with electric power. A central processing unit is connected to the microswitch and has a counter to count the shut off time of the electric power supplied to a compressor, and to resume the supply of electric power to the air conditioning compressor when a preset time has elapsed.

1 Claim, 4 Drawing Sheets

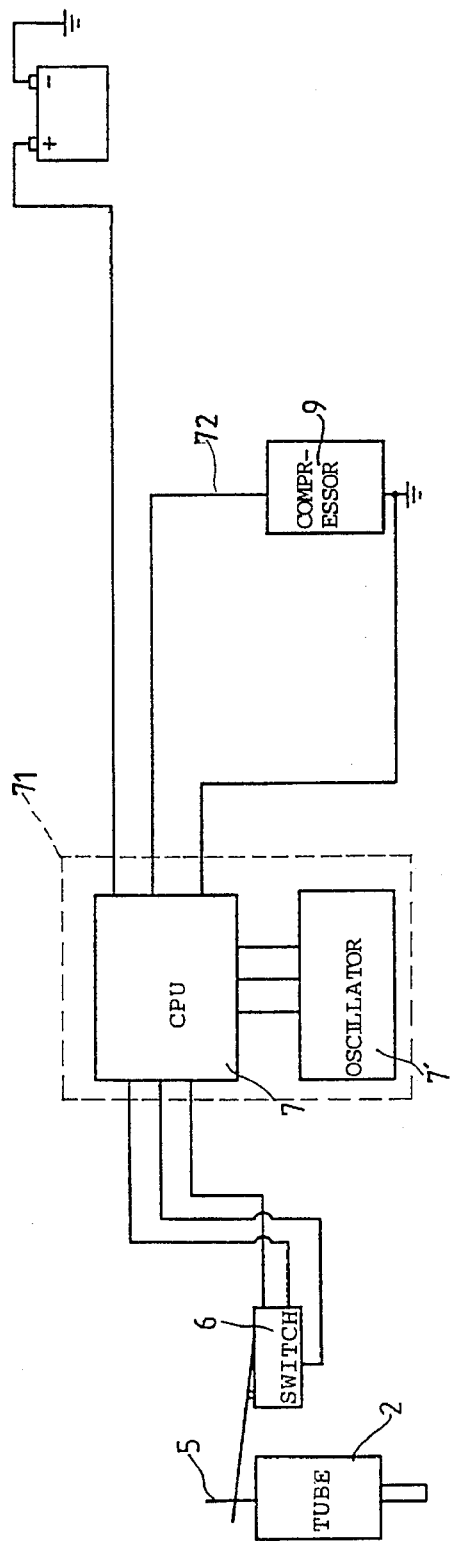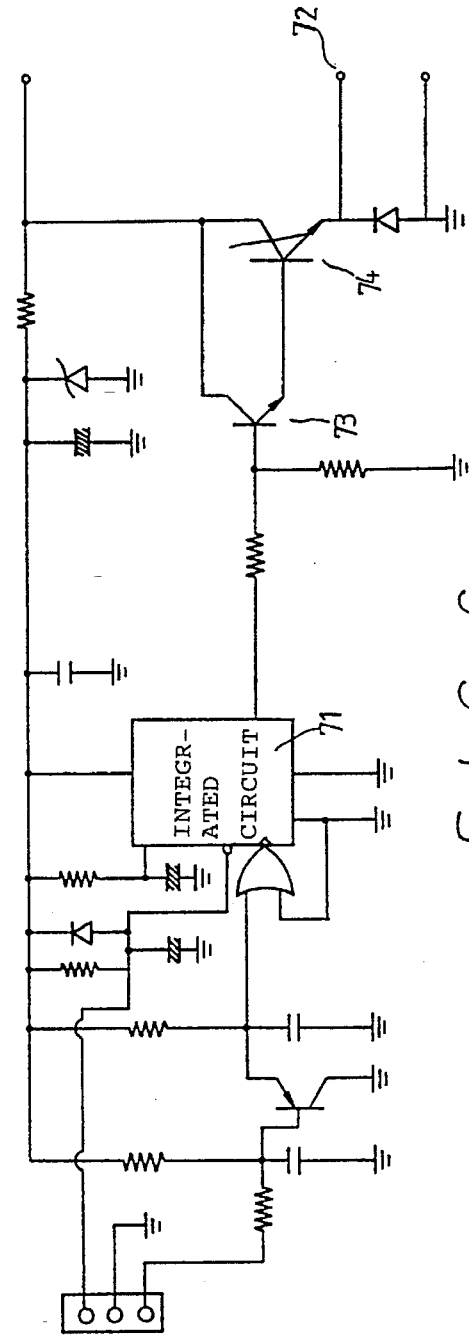

APPARATUS FOR TEMPORARILY SHUTTING OFF ELECTRIC POWER TO AN AIR CONDITIONING COMPRESSOR USING A PISTON AND MICROSWITCH

BACKGROUND OF THE INVENTION

This invention relates to an apparatus for temporarily shutting off electrical power to the air conditioning compressor of a vehicle and more particularly to supplying more power to the vehicle drive system when the engine RPM momentarily jumps from a slow speed to a high speed, or when the engine is fully loaded, as when the vehicle is climbing uphill.

Modern vehicles are designed to attract consumers and therefore have enhanced performance and luxury. The luxury accessories include such items as CD players, power seats, air bags, etc. Most of these accessories require electric power to operate, and therefore, a steady supply of electric power is required to power these accessories. However, when a vehicle is climbing uphill and fully loaded, or the vehicle is accelerating from a slow speed to a high speed, the electric power generated does not provide enough power for the engine to produce enough horsepower, and a power retardation will occur which causes gasoline combustion to be incomplete and thus carbons are collected on the spark plugs and smoke is expelled from the exhaust pipe.

SUMMARY OF THE INVENTION

It is the primary object of the present invention to provide an apparatus for temporarily shutting off electric power to the air conditioning compressor of a vehicle which thereby enables the electric power system of the vehicle to supply an adequate amount of electric power to the vehicle's engine for providing complete combustion.

BRIEF DESCRIPTION OF THE DRAWINGS

FIG. 5 is a block diagram of the present invention; and

FIG. 6 is a schematic diagram of the electric circuitry of the present invention.

DETAILED DESCRIPTION OF THE PREFERRED EMBODIMENT

Figure 1:
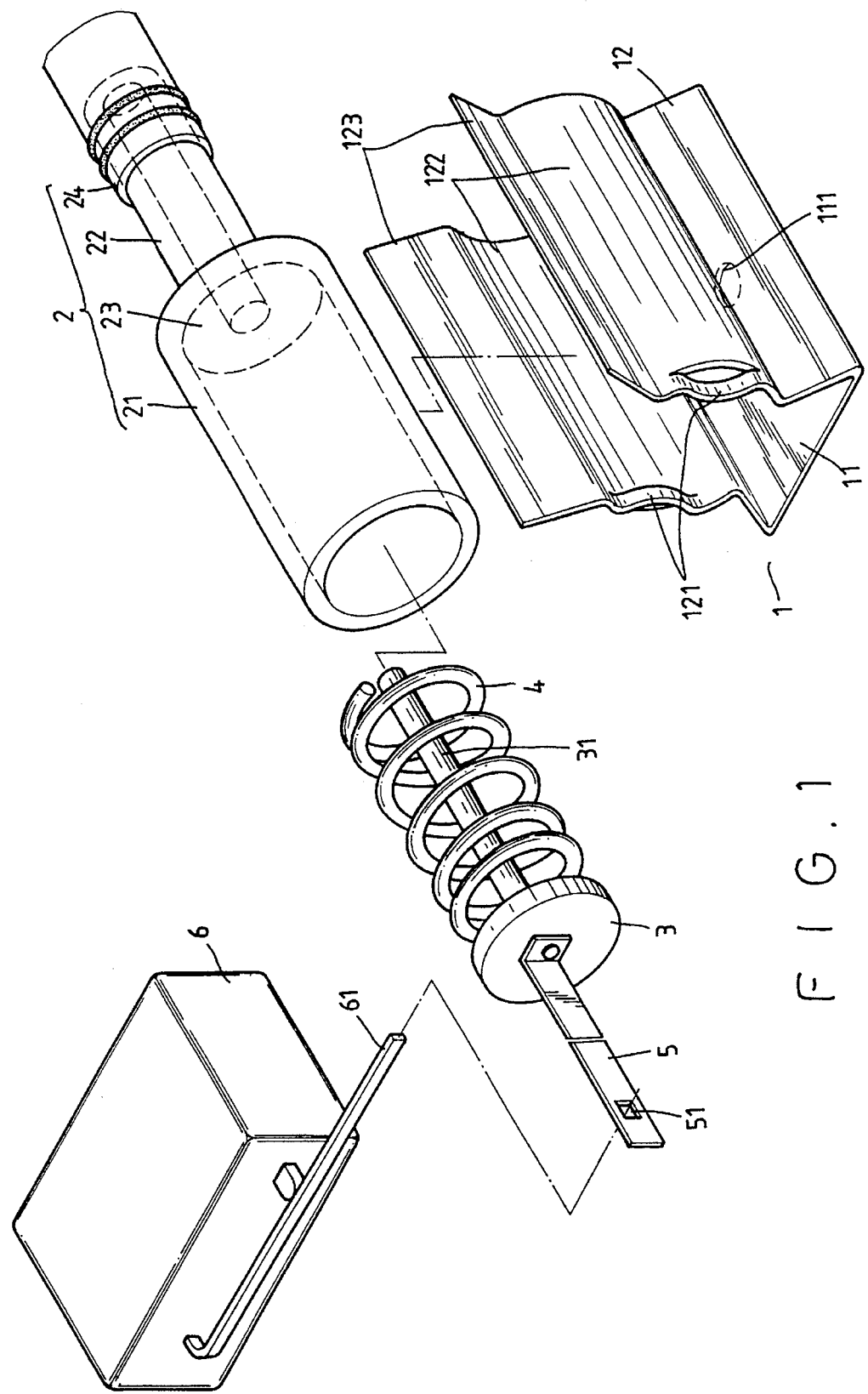
FIG. 1 is an exploded view of the present invention.

Referring now to FIGS. 1 through 6, there is illustrated a preferred embodiment of an apparatus for temporarily shutting off electric power to an air conditioning compressor during periods of heavy engine loading. The apparatus comprises a fixture 1 for holding a tube 2, the tube 2 having a larger-sized first section 21, a smaller-sized second section 22 and a shoulder 23 between the first section 21 and the second section 22. A piston 3 having a rod 31 extending from one side thereof is also provided, and a spring 4 having one end secured to one end of the piston 3 is disposed on the rod 31. A linking rod 5 is secured to and extends from the opposite side of the piston 3. A microswitch 6 having a spring plate 61 extending outwardly therefrom and a housing 8 are further included in the apparatus.

Figure 3:
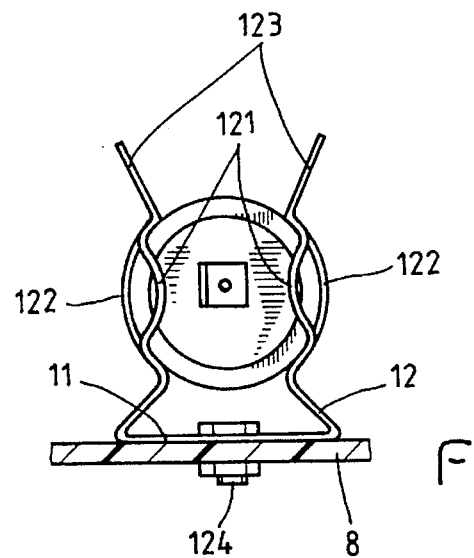
FIG. 3 is a front cross-sectional view of the present invention, with only certain parts of the apparatus being shown.

The fixture 1 may be formed by either metal or a temperature resistant plastic material, and is bent to have three surfaces: a bottom surface 11 which is secured to the housing 8 by a fastener 124, and two side surfaces 12 extending upwardly from respective sides of the bottom surface 11. The upwardly extending portions of the two side surfaces 12 are bent in several areas to form a pair of arcuate portions defining a seat 122 adapted to receive the larger first section 21 of the tube 2 therein, and a pair of guiding rails 123 which are adapted to guide the tube 2 to slide therealong into the seat 122. A portion of each arcuate portion of the fixture 1 is bent inwardly to form a blocking end 121 which prevents the tube 2 from moving forward in the seat 122 and the piston 3 from extending beyond the tube 2, as shown in FIG. 3. The second section 22 of the tube is connected to an intake manifold of the vehicle's engine (not shown in the Figures).

The piston 3 is sized to be received in the first section 21 of the tube 2 in a telescopic manner and includes a rod 31 secured to one end thereof which will be inserted into the second section 22 of the tube 2 to guide the piston 3 to slide in the tube 2. A linking rod 5 is secured to the opposite end of the piston 3 having an aperture 51 formed in the distal end thereof and adapted for extension of the spring plate 61 therethrough. The spring 4 is secured to the end of the piston 3 where the rod 31 is secured, and rests in the first section 21 of the tube 2, with the distal end of the spring 4 engaged with the shoulder 23 to bias the piston 3.

Figure 2:
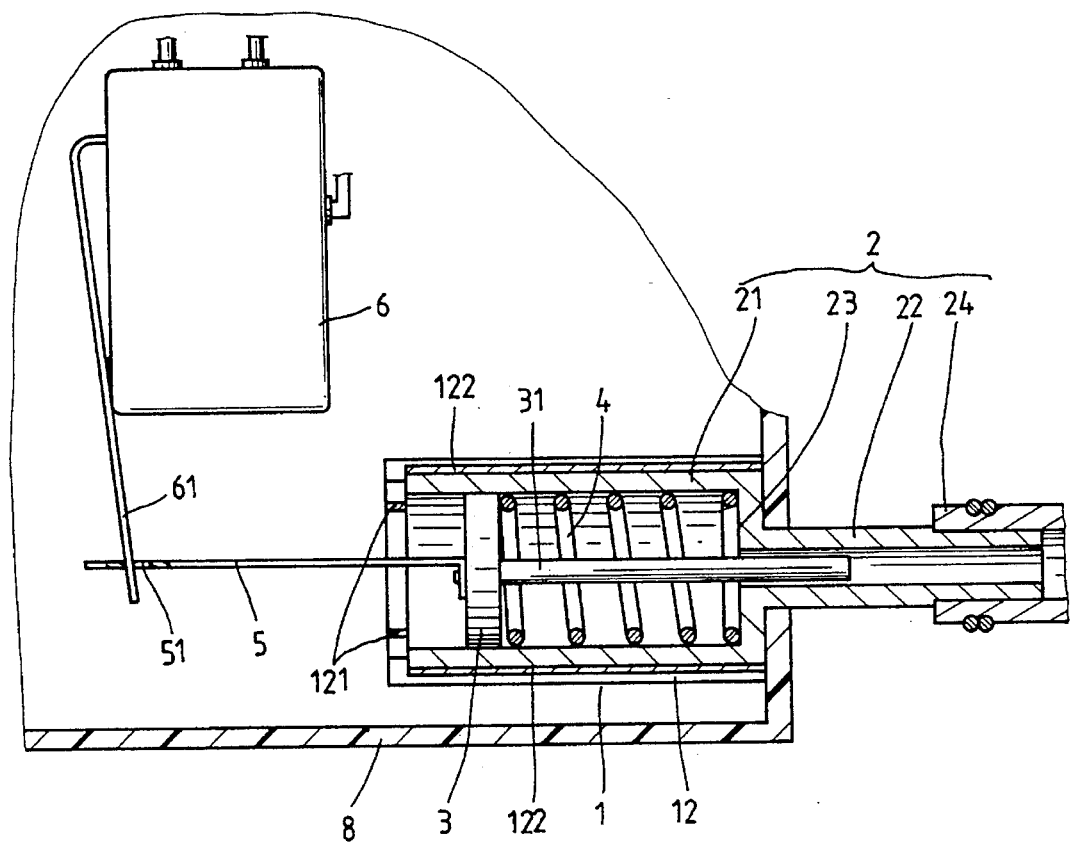
FIG. 2 is a top cross-sectional view of the present invention.
Figure 4:
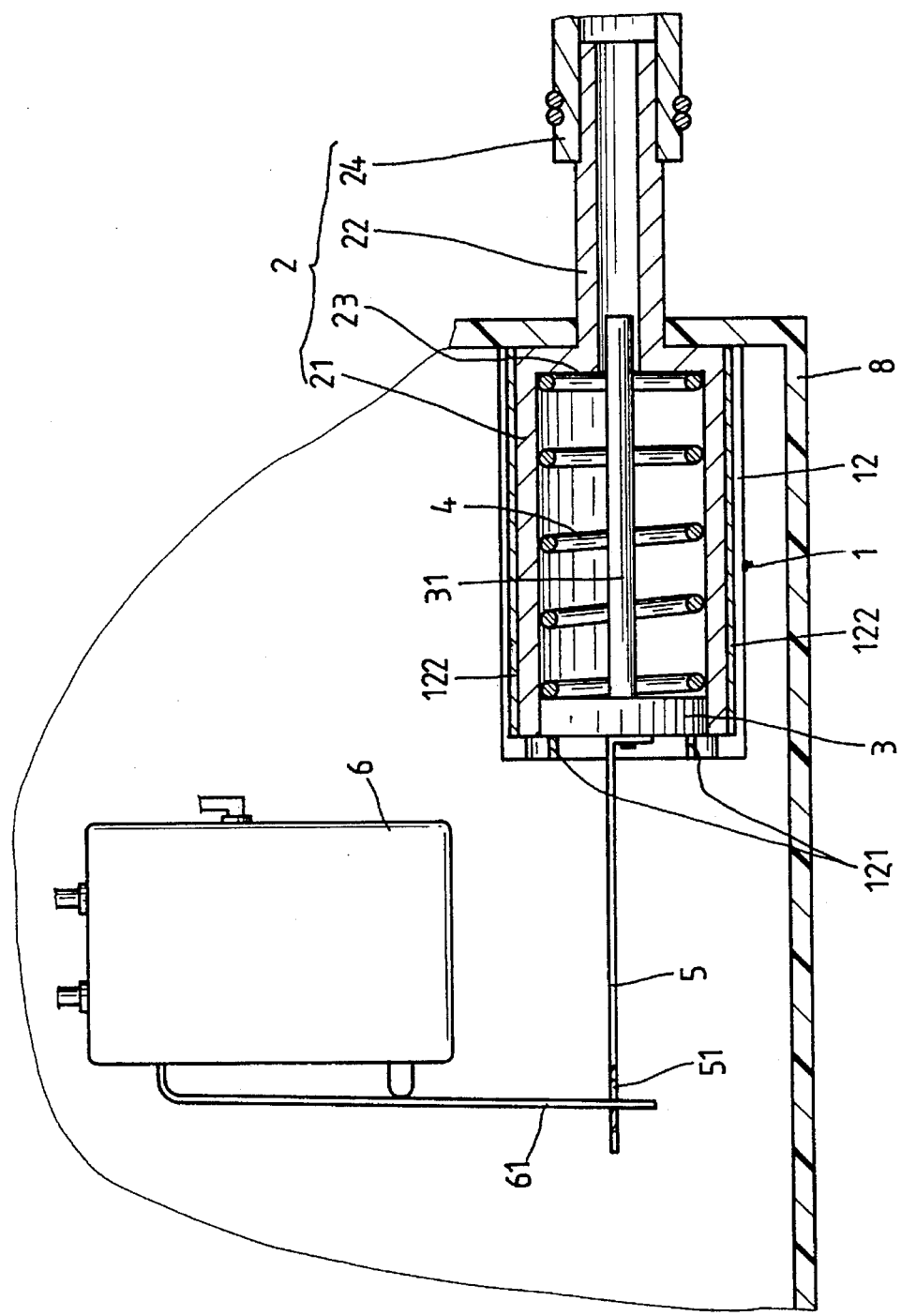
FIG. 4 is a further top cross-sectional view of the present invention showing its operation.

When the RPM of the engine of the vehicle is operated at a slow speed, the piston 3 will be sucked inwardly against the force of the spring 4 by engine vacuum, as shown in FIG. 2, and the microswitch 6 is then in a closed condition. When the RPM of the engine is changed from a slow speed to a high speed, momentarily, engine vacuum decreases and the piston 3 is displaced by the spring to extend outwardly, which pushes the spring plate 61 outwardly, as shown in FIG. 4, and the microswitch 6 is then in an open condition.

The microswitch 6, as shown in FIGS. 5 and 6, is connected to a central processing unit 7 which is included in an integrated circuit 71, and two transistors 74 and 73. The central processing unit 7 is connected to an oscillator 7', both of which are included in integrated circuit 71, to form a counter. When the microswitch 6 is in an open status, the central processing unit 7 will cut off the electric power output on line 72 to deactivate the air conditioning compressor 9. A counter is started by the central processing unit to count the cut off time, which is preset at 5 seconds. When the preset cut off time has been reached, the compressor 9 is activated again. Thus the engine load is reduced and electric power is fully supplied to the engine for the 5 second time period. In the meantime, if the RPM has returned to a slow speed, the piston 3 is again moved inwardly by engine vacuum, which activates the microswitch 6 and the compressor 9, simultaneously.

I claim:

1. An apparatus for temporarily shutting off electric power to an air conditioning compressor of a vehicle, comprising:

a housing;

a tube having a large-sized first section, a small-sized second section adapted for coupling to a source of engine vacuum, and a shoulder disposed between said first section and said second section;

a fixture having a bottom surface secured to a bottom portion of said housing and two side surfaces, said two side surfaces each having a corresponding arcuate portion defining a seat therebetween to receive said tube therein, each of said two side surfaces having a guiding rail portion for guiding said tube into sliding engagement with said seat, each of said side surfaces having a blocking end portion formed in said arcuate portion to block said tube from moving forward therefrom;

a piston slidingly disposed within said first section of said tube in a telescopic manner and having a rod member secured to a first side of said piston and extending into said second section of said tube, said piston having a linking rod secured to a second side thereof and extending therefrom;

a spring sleeved on said rod member of said piston with one end secured to said piston and an opposing other end of said spring disposed adjacent said shoulder of said tube for applying a bias force to said piston;

a microswitch having a spring plate extending therefrom for closing and opening said microswitch responsive to displacement of said spring plate, said spring plate having an end portion coupled to a distal end of said linking rod for displacing said spring plate responsive to a respective displacement of said piston; and, a central processing unit electrically coupled to said microswitch and a vehicle's air conditioning compressor, said central processing unit including a counter for establishing a predetermined time period, said central processing unit removing electric power from the vehicle's air conditioning compressor for said predetermined time period responsive to said opening of said microswitch when said bias force of said spring displaces said piston, said piston being displaced by said spring responsive to a reduction in vacuum supplied to said second section of said tube, said central processing unit supplying said electric power signal responsive to closure of said microswitch when said piston is displaced against said spring by an increase in vacuum supplied to said second section of said tube.

* * * * *